United States Patent
Ushio et al.

(10) Patent No.: US 9,673,458 B2
(45) Date of Patent: Jun. 6, 2017

(54) FUEL CELL

(71) Applicant: HONDA MOTOR CO., LTD., Tokyo (JP)

(72) Inventors: Takeshi Ushio, Wako (JP); Syuji Sato, Wako (JP); Masaru Oda, Wako (JP); Yuji Asano, Wako (JP); Koji Moriyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/191,428

(22) Filed: Feb. 27, 2014

(65) Prior Publication Data

US 2014/0248549 A1 Sep. 4, 2014

(30) Foreign Application Priority Data

Mar. 4, 2013 (JP) .................. 2013-041917

(51) Int. Cl.
| | |
|---|---|
| H01M 8/0273 | (2016.01) |
| H01M 8/242 | (2016.01) |
| H01M 8/0276 | (2016.01) |
| H01M 8/0258 | (2016.01) |
| H01M 8/1018 | (2016.01) |

(52) U.S. Cl.
CPC ....... *H01M 8/0273* (2013.01); *H01M 8/0276* (2013.01); *H01M 8/242* (2013.01); *H01M 8/0258* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 7,704,625 B2 | 4/2010 | Tanaka et al. | |
| 7,758,991 B2 | 7/2010 | Goto et al. | |
| 7,759,014 B2 | 7/2010 | Wakahoi et al. | |
| 7,968,249 B2 | 6/2011 | Tanaka et al. | |
| 8,268,507 B2 | 9/2012 | Tanaka et al. | |
| 2005/0130016 A1* | 6/2005 | Yang | .............. 429/35 |
| 2008/0292930 A1* | 11/2008 | Oda | ......... H01M 8/0267 429/483 |
| 2011/0207018 A1* | 8/2011 | Nakagawa et al. | ........ 429/483 |

FOREIGN PATENT DOCUMENTS

| | | |
|---|---|---|
| JP | 2004-335178 | 11/2004 |
| JP | 4214027 B2 | 4/2005 |
| JP | 4426429 B2 | 6/2006 |
| JP | 5112004 B2 | 5/2009 |
| JP | 2010-153175 | 7/2010 |
| JP | 5349184 B2 | 2/2011 |

OTHER PUBLICATIONS

Tanaka et al. (JP, 2004-335178) (a raw machine translation) (Abstract, Detailed Description & Drawings) (Nov. 25, 2004).*
Japanese Office Action for corresponding JP Application No. 2013-041917, Aug. 30, 2016 (w/ English machine translation).

* cited by examiner

*Primary Examiner* — Patrick Ryan
*Assistant Examiner* — Carmen Lyles-Irving
(74) *Attorney, Agent, or Firm* — Mori & Ward, LLP

(57) ABSTRACT

A fuel cell includes a membrane electrode assembly, a separator, a fluid channel, a fluid manifold, a plurality of protruding elastic members, and a plurality of sealing members. A fluid is to flow in a stacking direction through the fluid manifold. A connection channel is provided between the plurality of protruding elastic members to connect the fluid channel and the fluid manifold. The plurality of sealing members are provided adjacent to the plurality of protruding elastic members in the stacking direction and extend in a direction to cross a flow direction in which the fluid flows along the connection channel. Each of the plurality of protruding elastic members has overlapping regions that overlap the plurality of sealing members as seen from the stacking direction. The overlapping regions are separated from each other in the flow direction.

14 Claims, 10 Drawing Sheets

FUEL CELL

CROSS-REFERENCE TO RELATED APPLICATIONS

The present application claims priority under 35 U.S.C. §119 to Japanese Patent Application No. 2013-041917, filed Mar. 4, 2013, entitled "Fuel Cell." The contents of this application are incorporated herein by reference in their entirety.

BACKGROUND

1. Field

The present disclosure relates to a fuel cell.

2. Description of the Related Art

For example, a solid polymer electrolyte fuel cell includes a power generation cell that includes a membrane electrode assembly (MEA) and a pair of separators sandwiching the MEA therebetween. The MEA includes a solid polymer electrolyte membrane made from a polymer ion-exchange membrane, an anode separator disposed on one side of the electrolyte membrane, and a cathode electrode disposed on the other side of the electrolyte membrane. Usually, a fuel cell includes such power generation cells that are stacked each other. For example, the fuel cell is mounted on a fuel-cell electric vehicle and used as an automobile fuel cell system.

In the fuel cell described above, a fuel gas channel (fluid channel), through which a fuel gas (fluid) flows, is formed on a surface of a separator so as face the anode electrode; and an oxidant gas channel (fluid channel), through which an oxidant gas (fluid) flows, is formed on a surface of a separator so as to face the cathode electrode.

A fuel gas inlet manifold, a fuel gas outlet manifold, an oxidant gas inlet manifold, and an oxidant gas outlet manifold extend through peripheral portions of the separators in the stacking direction of the separators. The fuel gas inlet manifold and the fuel gas outlet manifold are fluid manifolds connected to the fuel gas channel. The oxidant gas inlet manifold and the oxidant gas outlet manifold are fluid manifolds connected to the oxidant gas channel. A coolant channel (fluid channel) for cooling the membrane electrode assembly is disposed between the separators. A coolant inlet manifold and a coolant outlet manifold extend through the separators in the stacking direction. The coolant inlet manifold and the coolant outlet manifold are fluid manifolds connected to the coolant channel.

In this case, the fluid channels and the fluid manifolds are connected to each other through connection channels. Each of the connection channels has parallel grooves so that fluid can smoothly and uniformly flow therethrough. For example, Japanese Patent No. 4214027 describes a fuel cell that includes a membrane electrode assembly and a pair of separators sandwiching the membrane electrode assembly therebetween. A bridge portion, which extends from a reactant gas manifold to a reactant gas channel, is disposed between the separators. The bridge portion includes a flat seal, which is disposed on one of the separators, and a plurality of protruding seals, which are disposed on the other separator so as to be in contact with the flat seal. A reactant gas connection channel is formed between the flat seal and the protruding seals, and the reactant gas connection channel connects the reactant gas manifold and the reactant gas channel to each other.

Therefore, the process of assembling the fuel cell can be considerably simplified, and a desirable sealability can be achieved with a simple and economical structure. Moreover, a reactant gas connection channel is formed between the flat seal and the protruding seals, and the reactant gas manifold and the reactant gas channel can be reliably connected to each other through the reactant gas connection channel.

SUMMARY

According to one aspect of the present invention, a fuel cell includes a membrane electrode assembly, a separator, a fluid channel, a fluid manifold, a plurality of protruding elastic members, and a plurality of sealing members. The membrane electrode assembly includes an electrolyte membrane and a pair of electrodes sandwiching the electrolyte membrane therebetween. The separator has a surface and is stacked on the membrane electrode assembly in a stacking direction substantially perpendicular to the surface so that the surface faces the membrane electrode assembly. A fluid is to flow along the surface of the separator through the fluid channel. The fluid includes at least one of a fuel gas, an oxidant gas, and a coolant. The fluid is to flow in the stacking direction through the fluid manifold. A connection channel is provided between the plurality of protruding elastic members to connect the fluid channel and the fluid manifold. The plurality of sealing members are provided adjacent to the plurality of protruding elastic members in the stacking direction and extend in a direction to cross a flow direction in which the fluid flows along the connection channel. Each of the plurality of protruding elastic members has overlapping regions that overlap the plurality of sealing members as seen from the stacking direction. The overlapping regions are separated from each other in the flow direction.

According to another aspect of the present invention, a fuel cell includes a membrane electrode assembly, a separator, a fluid channel, a fluid manifold, a plurality of protruding elastic members, and a plurality of sealing members. The membrane electrode assembly includes an electrolyte membrane, a first electrode, and a second electrode. The first electrode and the second electrode sandwiches the electrolyte membrane therebetween. The separator has a surface and is stacked on the membrane electrode assembly in a stacking direction substantially perpendicular to the surface so that the surface faces the membrane electrode assembly. The fluid channel is provided between the surface of the separator and the membrane electrode assembly and a fluid is to flow along the surface of the separator through the fluid channel. The fluid includes at least one of a fuel gas, an oxidant gas, and a coolant. The fluid manifold is provided to pass through the separator along the stacking direction and the fluid is to flow in the stacking direction through the fluid manifold. A connection channel is provided between the plurality of protruding elastic members to connect the fluid channel and the fluid manifold. The plurality of sealing members are provided adjacent to the plurality of protruding elastic members in the stacking direction and extend in a direction to cross a flow direction in which the fluid flows along the connection channel. Each of the plurality of protruding elastic members has overlapping regions that overlap the plurality of sealing members as seen from the stacking direction. The overlapping regions are separated from each other in the flow direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
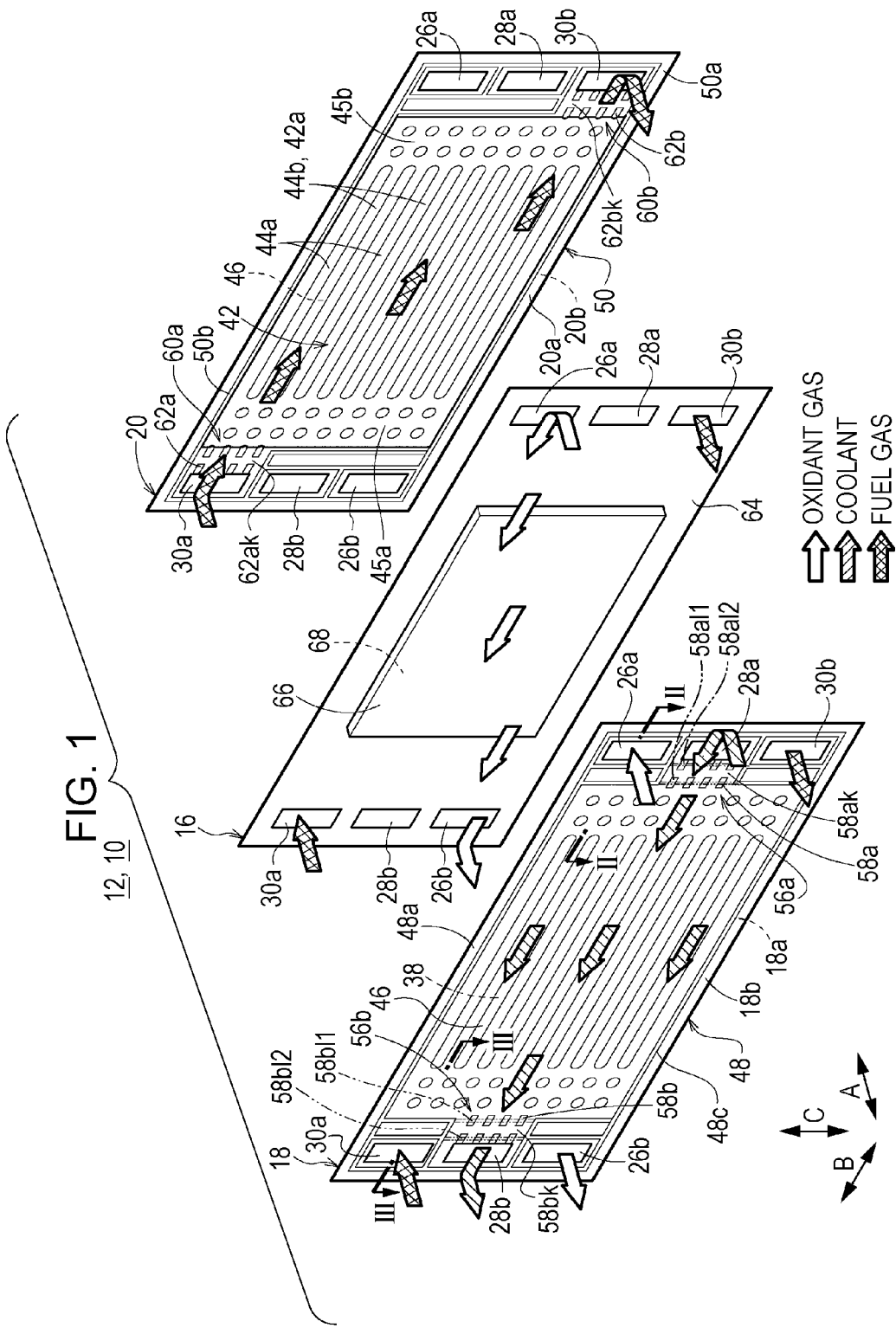
FIG. 1 is an exploded perspective view of a power generation cell of a fuel cell according to a first embodiment of the present disclosure.

The embodiments will now be described with reference to the accompanying drawings, wherein like reference numerals designate corresponding or identical elements throughout the various drawings.

Figure 2:
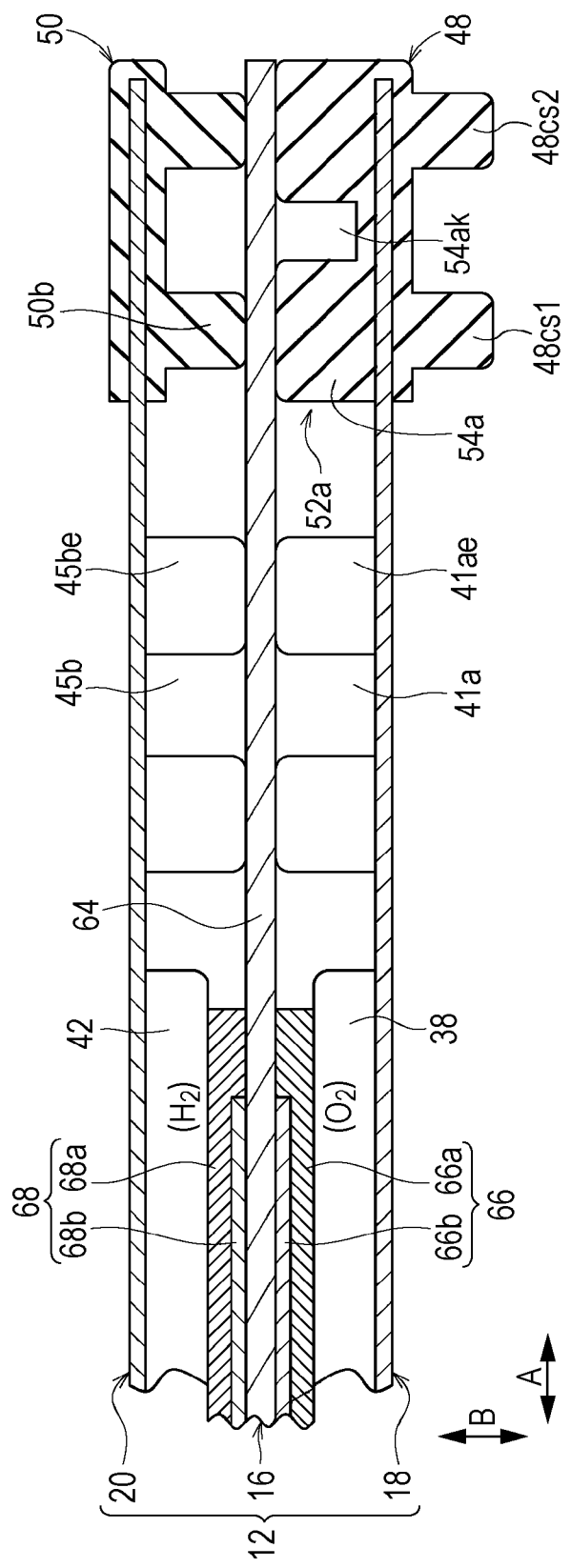
FIG. 2 is a sectional view of the power generation cell taken along line II-II of FIG. 1.
Figure 3:
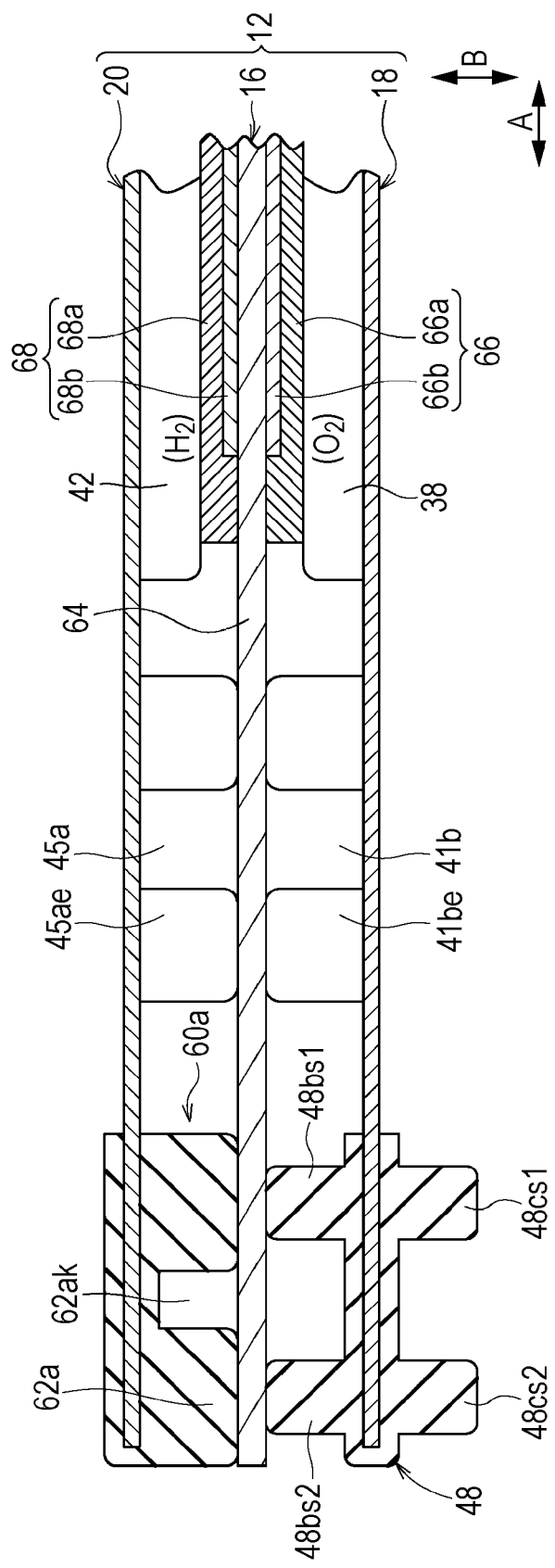
FIG. 3 is a sectional view of the power generation cell taken along line III-III of FIG. 1.

As illustrated in FIGS. 1 to 3, a fuel cell 10 according to a first embodiment of the present disclosure includes a plurality of power generation cells 12 that are each disposed in an upright position and that are stacked in a horizontal direction (direction of arrow A). The power generation cells 12 may be stacked in the direction of gravity.

Each of the power generation cells 12 has a horizontally elongated shape and includes a membrane electrode assembly (MEA) 16, and a first metal separator 18 and a second metal separator 20 that sandwich the membrane electrode assembly 16 therebetween. The first metal separator 18 and the second metal separator 20 are each made by press-forming a thin metal plate so as to have a corrugated cross-sectional shape.

The first metal separator 18 and the second metal separator 20 are each made from, for example, an aluminum plate, a stainless steel plate, a titanium plate, a niobium plate, or the like. Carbon separators may be used instead of the first metal separator 18 and the second metal separator 20.

An oxidant gas inlet manifold (fluid manifold) 26a, a coolant inlet manifold (fluid manifold) 28a, and a fuel gas outlet manifold (fluid manifold) 30b are formed in the power generation cell 12 so as to extend in the direction of arrow A (in FIG. 1) at one end portion of the power generation cell 12 in the longitudinal direction (direction of arrow B). An oxidant gas, such as an oxygen-containing gas, is supplied through the oxidant gas inlet manifold 26a. A coolant is supplied through the coolant inlet manifold 28a. A fuel gas, such as a hydrogen-containing gas, is discharged through the fuel gas outlet manifold 30b.

A fuel gas inlet manifold (fluid manifold) 30a, a coolant outlet manifold (fluid manifold) 28b, and an oxidant gas outlet manifold (fluid manifold) 26b are formed in the power generation cell 12 so as to extend in the direction of arrow A at the other end portion of the power generation cell 12 in the longitudinal direction. The fuel gas is supplied through the fuel gas inlet manifold 30a. The coolant is discharged through the coolant outlet manifold 28b. The oxidant gas is discharged through the oxidant gas outlet manifold 26b.

Figure 4:
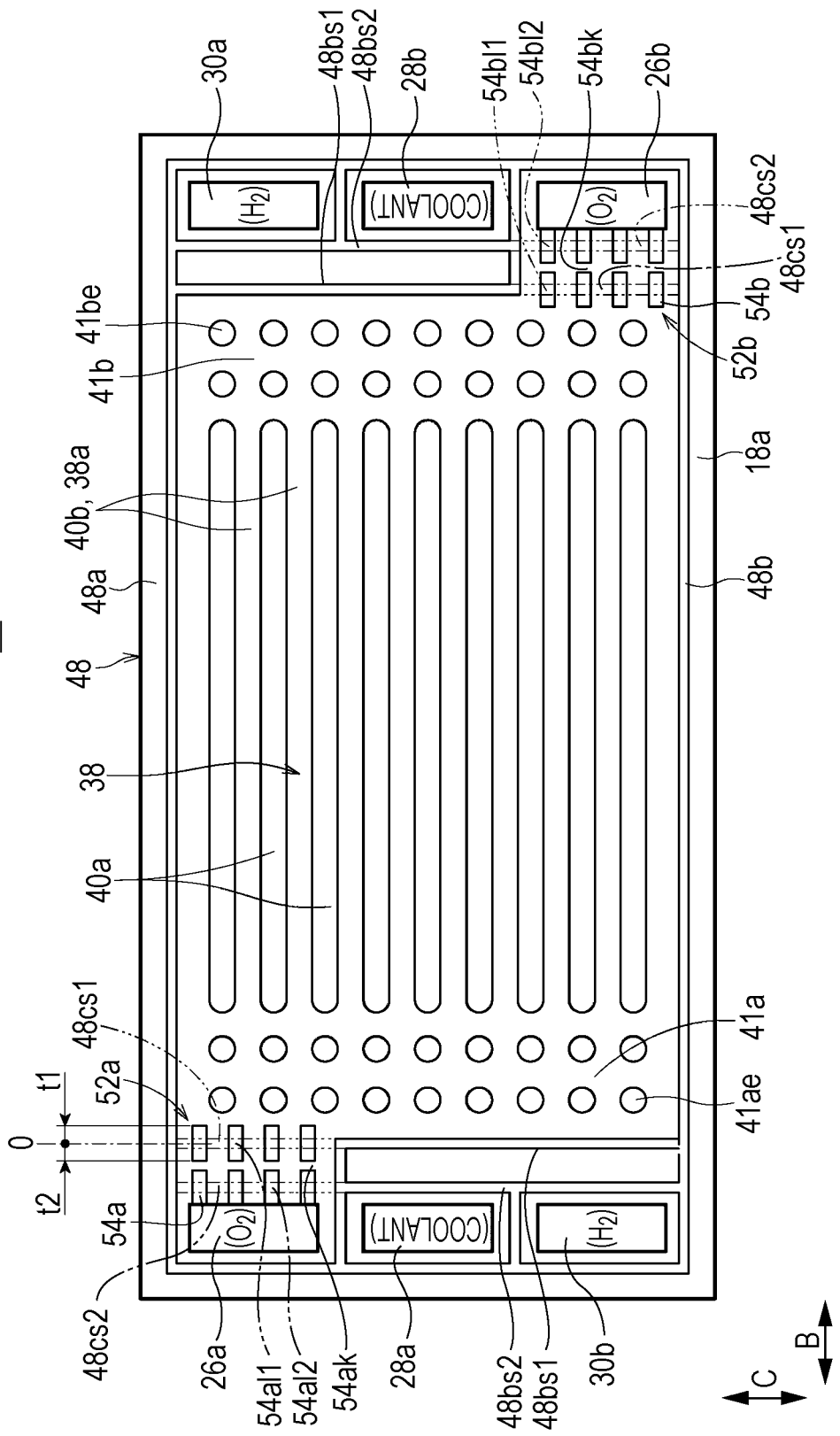
FIG. 4 is a plan view of a first metal separator of the power generation cell.

As illustrated in FIGS. 1 and 4, an oxidant gas channel (fluid channel) 38, through which the oxidant gas inlet manifold 26a is connected to the oxidant gas outlet manifold 26b, is formed on a surface 18a of the first metal separator 18 facing the membrane electrode assembly 16. The oxidant gas channel 38 has a plurality of oxidant gas channel grooves 38a. Protruding portions 40a and recessed portions 40b, each extending in the direction of arrow B, are alternately arranged in the direction of arrow C, and therefore the oxidant gas channel grooves 38a are formed along the recessed portions 40b. The protruding portions 40a are in contact with the membrane electrode assembly 16, but the recessed portions 40b are separated from the membrane electrode assembly 16.

An inlet buffer portion 41a is disposed on the inlet side of the oxidant gas channel 38. The inlet buffer portion 41a has a plurality of protrusions 41ae protruding toward the membrane electrode assembly 16. An outlet buffer portion 41b is disposed on the outlet side of the oxidant gas channel 38. The outlet buffer portion 41b has a plurality of protrusions 41be protruding toward the membrane electrode assembly 16.

Figure 5:
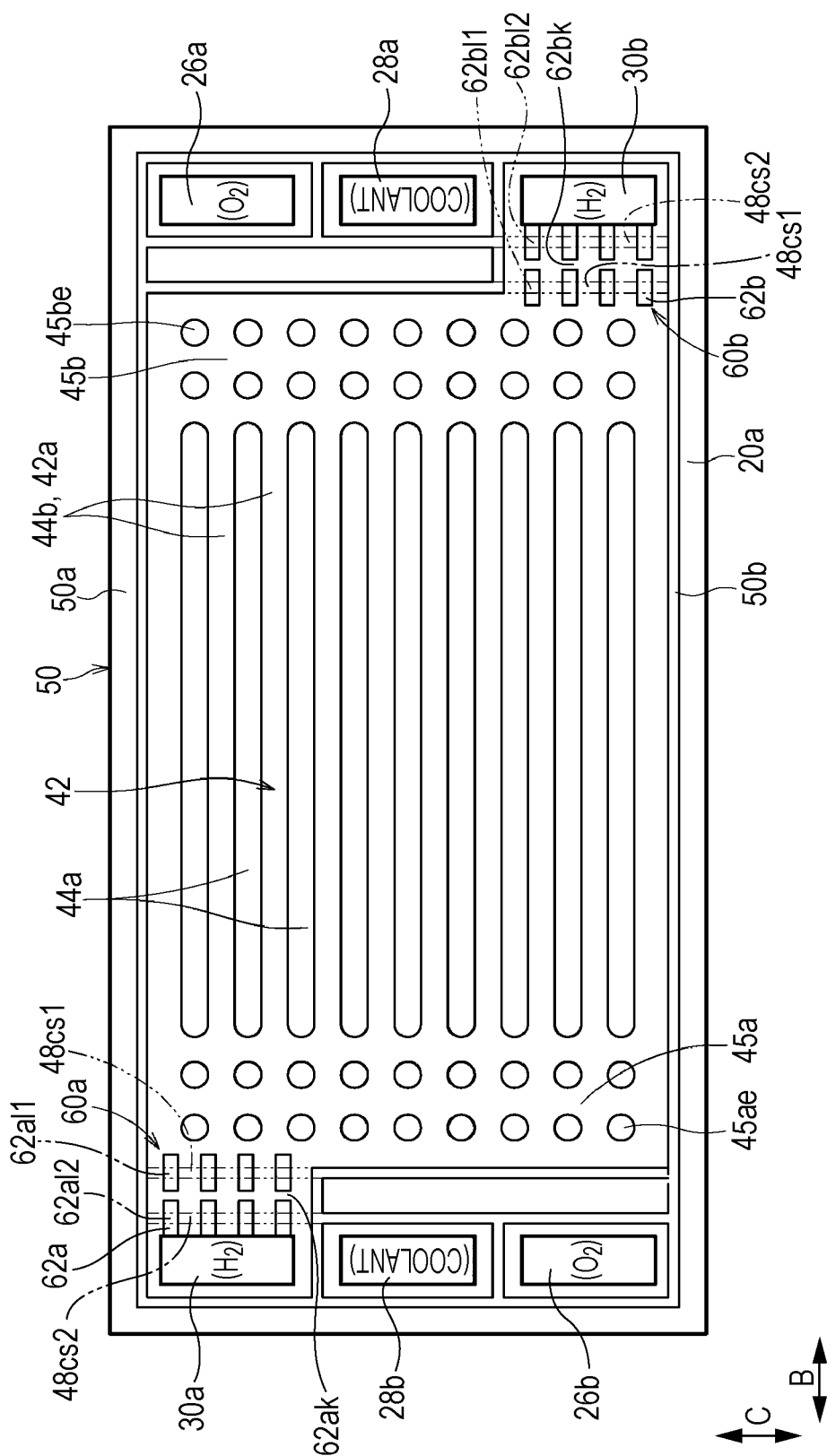
FIG. 5 is a plan view of a second metal separator of the power generation cell.

As illustrated in FIG. 5, a fuel gas channel (fluid channel) 42, through which the fuel gas inlet manifold 30a is connected to the fuel gas outlet manifold 30b, is formed on a surface 20a of the second metal separator 20 facing the membrane electrode assembly 16. The fuel gas channel 42 has a plurality of fuel gas channel grooves 42a. Protruding portions 44a and recessed portions 44b, each extending in the direction of arrow B, are alternately arranged in the direction of arrow C, and therefore the fuel gas channel grooves 42a are formed along the recessed portions 44b. The protruding portions 44a are in contact with the membrane electrode assembly 16, but the recessed portions 44b are separated from the membrane electrode assembly 16.

An inlet buffer portion 45a is disposed on the inlet side of the fuel gas channel 42. The inlet buffer portion 45a has a plurality of protrusions 45ae protruding toward the membrane electrode assembly 16. An outlet buffer portion 45b is disposed on the outlet side of the fuel gas channel 42. The outlet buffer portion 45b has a plurality of protrusions 45be protruding toward the membrane electrode assembly 16.

As illustrated in FIG. 1, a coolant channel 46 is integrally formed between a surface 18b of the first metal separator 18 and a surface 20b of the second metal separator 20 that are located adjacent to each other. The coolant inlet manifold 28a is connected to the coolant outlet manifold 28b through the coolant channel (fluid channel) 46. The coolant channel 46 is formed between the back side of the oxidant gas channel 38 and the back side of the fuel gas channel 42.

A first sealing member 48 is integrally formed on the surfaces 18a and 18b of the first metal separator 18 so as to surround the outer periphery of the first metal separator 18. A second sealing member 50 is integrally formed on the surface 20a and the surface 20b of the second metal separator 20 so as to surround the outer periphery of the second metal separator 20.

Each of the first sealing member 48 and the second sealing member 50 is made from an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

As illustrated in FIGS. 1 and 4, the first sealing member 48 includes a planar sealing portion 48a, which is formed on the surfaces 18a and 18b so as to have a uniform thickness. The first sealing member 48 further includes a protruding sealing portion 48b, which protrudes from the planar sealing portion 48a on the surface 18a. The protruding sealing portion 48b surrounds the oxidant gas inlet manifold 26a, the oxidant gas outlet manifold 26b, and the oxidant gas channel 38 so that they are connected to each other (see FIG. 4).

The first sealing member 48 further includes a protruding sealing portion 48c, which protrudes from the planar sealing portion 48a on the surface 18b. The protruding sealing portion 48c surrounds the coolant inlet manifold 28a, the coolant outlet manifold 28b, and the coolant channel 46 so that they are connected to each other (see FIG. 1).

The second sealing member 50 includes a planar sealing portion 50a, which is formed on the surfaces 20a and 20b so as to have a uniform thickness. The second sealing member 50 further includes a protruding sealing portion 50b, which protrudes from the planar sealing portion 50a on the surface 20a. The protruding sealing portion 50b surrounds the fuel gas inlet manifold 30a, the fuel gas outlet manifold 30b, and the fuel gas channel 42 so that they are connected to each other (see FIGS. 1 and 5).

As illustrated in FIG. 4, an inlet connection channel 52a and an outlet connection channel 52b are disposed on the surface 18a of the first metal separator 18. The inlet connection channel 52a connects the oxidant gas inlet manifold 26a and the inlet buffer portion 41a to each other. The outlet connection channel 52b connects the oxidant gas outlet manifold 26b and the outlet buffer portion 41b to each other.

The inlet connection channel 52a is formed between a plurality of protruding elastic members (so-called rubber bridges) 54a so as to extend in the direction of arrow B. The protruding elastic members 54a are integrally formed with the first sealing member 48. (Alternatively, the protruding elastic members 54a may be formed by joining independent members to the first sealing member 48.) The inlet connection channel 52a extends from the oxidant gas inlet manifold 26a toward the inlet buffer portion 41a. The protruding elastic members 54a may be made of a material the same as that of the first sealing member 48, or may be made from a different rubber member.

Each of the protruding elastic members 54a has overlapping regions that overlap the protruding sealing portion 48c of the first sealing member 48 on the opposite side of the first metal separator 18 as seen from the stacking direction (direction of arrow A). To be specific, each of the protruding elastic members 54a has overlapping regions 54a/1 and 54a/2 that respectively overlap sealing portions 48cs1 and 48cs2, which are located adjacent to the protruding elastic members 54a in the stacking direction and which extend in a direction (direction of arrow C) that crosses a direction (direction of arrow B) in which the oxidant gas flows through the inlet connection channel 52a. The overlapping regions 54a/1 and 54a/2 are separated from each other in the direction in which the oxidant gas flows.

Figure 6:
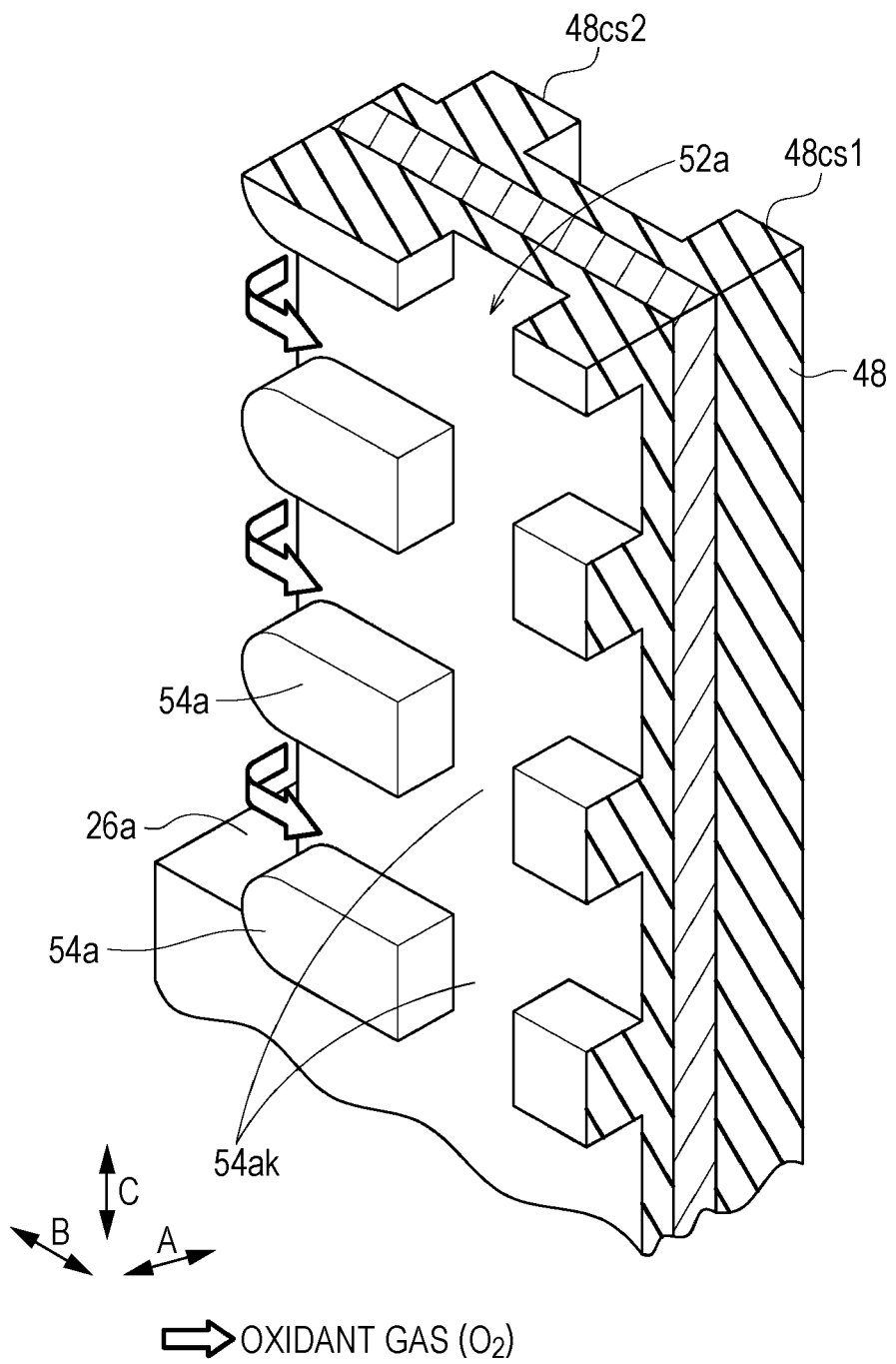
FIG. 6 is a partial perspective view of the first metal separator.

In other words, each of the protruding elastic members 54a has a cutout portion 54ak, which is formed so as to correspond to a space between the sealing portions 48cs1 and 48cs2. Thus, the protruding elastic member 54a is separated into two portions, the number of which is the same as the number of the sealing portions 48cs1 and 48cs2 (see FIGS. 4 and 6). The number of portions into which each of the protruding elastic members 54a is separated may be the same as the number of sealing portions disposed on the back side, which is, for example, three or four. The same applies to the coolant side and the fuel gas side, which will be described below.

The center O of the sealing portion 48cs1 in the width direction (direction of arrow B) coincides with the center of the protruding elastic member 54a in the longitudinal direction (direction of arrow B). In other words, the distance t1 from the center O to an end of the protruding elastic member 54a in the longitudinal direction is the same as the distance t2 from the center O to the other end of the protruding elastic member 54a in the longitudinal direction (t1=t2). The same applies to other sealing portions and other protruding elastic members, which will be described below.

The outlet connection channel 52b has a structure substantially the same as that of the inlet connection channel 52a. Parts of the outlet connection channel 52b that are the same as those of the inlet connection channel 52a will be denoted by attaching a letter "b", instead of "a", to the same numeral; and detailed description of such parts will be omitted.

As illustrated in FIG. 1, an inlet connection channel 56a and an outlet connection channel 56b are disposed on the surface 18b of the first metal separator 18. The inlet connection channel 56a connects the coolant inlet manifold 28a and the coolant channel 46 to each other. The outlet connection channel 56b connects the coolant outlet manifold 28b and the coolant channel 46 to each other.

The inlet connection channel 56a is formed between a plurality of protruding elastic members (so-called rubber bridges) 58a so as to extend in the direction of arrow B. The protruding elastic members 58a are integrally formed with the first sealing member 48. (Alternatively, the protruding elastic members 58a may be formed by joining independent members to the first sealing member 48.) The inlet connection channel 56a extends from the coolant inlet manifold 28a toward the inlet buffer portion (which is the back side of the inlet buffer portion 41a).

Each of the protruding elastic members 58a has overlapping regions that overlap the protruding sealing portion 48b of the first sealing member 48 on the opposite side of the first metal separator 18 as seen from the stacking direction (direction of arrow A). To be specific, each of the protruding elastic members 58a has overlapping regions 58a/1 and 58a/2 that respectively overlap sealing portions 48bs1 and 48bs2 (see FIG. 4), which are located adjacent to the protruding elastic member 58a in the stacking direction and which extend in a direction (direction of arrow C) that crosses a direction (direction of arrow B) in which the coolant flows through the inlet connection channel 56a. The overlapping regions 58a/1 and 58a/2 are separated from each other in the direction in which the coolant flows.

In other words, each of the protruding elastic members 58a has a cutout portion 58ak, which is formed so as to correspond to a space between the sealing portions 48bs1 and 48bs2. Thus, the protruding elastic member 58a is separated into two portions, the number of which is the same as the number of the sealing portions 48bs1 and 48bs2.

The outlet connection channel 56b has a structure substantially the same as that of the inlet connection channel 56a. Parts of the outlet connection channel 56b that are the same as those of the inlet connection channel 56a will be denoted by attaching a letter "b", instead of "a", to the same numeral; and detailed description of such parts will be omitted.

As illustrated in FIGS. 1 and 5, an inlet connection channel 60a and an outlet connection channel 60b are disposed on the surface 20a of the second metal separator 20. The inlet connection channel 60a connects the fuel gas inlet manifold 30a and the inlet buffer portion 45a to each other. The outlet connection channel 60b connects the fuel gas outlet manifold 30b and the outlet buffer portion 45b to each other.

The inlet connection channel 60a is formed between a plurality of protruding elastic members (so-called rubber bridges) 62a so as to extend in the direction of arrow B. The protruding elastic members 62a are integrally formed with the second sealing member 50. (Alternatively, the protruding elastic members 62a may be formed by joining independent members to the second sealing member 50.) The inlet connection channel 60a extends from the fuel gas inlet manifold 30a toward the inlet buffer portion 45a. The protruding elastic members 62a may be made of a material the same as that of the second sealing member 50, or may be made from a different rubber member.

Each of the protruding elastic members 62a has overlapping regions that overlap the protruding sealing portion 48c of the first sealing member 48 on the opposite side of the first metal separator 18 as seen from the stacking direction (direction of arrow A). To be specific, each of the protruding elastic members 62a has overlapping regions 62a/1 and 62a/2 that respectively overlap the sealing portions 48cs1 and 48cs2, which are located adjacent to the protruding elastic member 62a in the stacking direction and which extend in a direction (direction of arrow C) that crosses a direction (direction of arrow B) in which the fuel gas flows through the inlet connection channel 60a. The overlapping regions 62a/1 and 62a/2 are separated from each other in the direction in which the fuel gas flows.

In other words, each of the protruding elastic members 62a has a cutout portion 62ak, which is formed so as to correspond to a space between the sealing portions 48cs1 and 48cs2. Thus, the protruding elastic member 62a is separated into two portions, the number of which is the same as the number of the sealing portions 48cs1 and 48cs2.

The outlet connection channel 60b has a structure substantially the same as that of the inlet connection channel 60a. Parts of the outlet connection channel 60b that are the same as those of the inlet connection channel 60a will be denoted by attaching a letter "b", instead of "a", to the same numeral; and detailed description of such parts will be omitted.

The membrane electrode assembly 16 includes a solid polymer electrolyte membrane 64, and a cathode electrode 66 and an anode electrode 68 sandwiching the solid polymer electrolyte membrane 64 therebetween. The solid polymer electrolyte membrane 64 is, for example, a thin film that is made of a perfluorosulfonate polymer and that is impregnated with water. The solid polymer electrolyte membrane 64 has planar dimensions that are substantially the same as or greater than those of each of the cathode electrode 66 and the anode electrode 68. The outer periphery of the solid polymer electrolyte membrane 64 protrudes outward from the outer peripheries of the cathode electrode 66 and the anode electrode 68. Alternatively, only one of the cathode electrode 66 and the anode electrode 68 may have planar dimensions that are substantially the same as those of the solid polymer electrolyte membrane 64.

As illustrated in FIGS. 2 and 3, the cathode electrode 66 includes a cathode-side gas diffusion layer 66a and a cathode-side electrode catalyst layer 66b; and the anode electrode 68 includes an anode-side gas diffusion layer 68a and an anode-side electrode catalyst layer 68b. The gas diffusion layers 66a and 68a are made of carbon paper or the like. The electrode catalyst layers 66b and 68b are respectively formed on surfaces of the gas diffusion layers 66a and 68a by uniformly coating the surfaces with porous carbon particles whose surfaces support a platinum alloy.

The operation of the fuel cell 10 will be described below.

As illustrated in FIG. 1, in the fuel cell 10, an oxidant gas, such as an oxygen-containing gas, is supplied to the oxidant gas inlet manifold 26a; and a fuel gas, such as a hydrogen-containing gas, is supplied to the fuel gas inlet manifold 30a. A coolant, such as pure water, ethylene glycol, or the like, is supplied to the coolant inlet manifold 28a. Therefore, in each of the power generation cells 12, the oxidant gas, the fuel gas, and the coolant are supplied in the direction of arrow A.

As illustrated in FIGS. 1 and 4, the oxidant gas is introduced from the oxidant gas inlet manifold 26a into the oxidant gas channel 38 of the first metal separator 18, and flows along the cathode electrode 66 of the membrane electrode assembly 16. As illustrated in FIGS. 1 and 5, the fuel gas is introduced from the fuel gas inlet manifold 30a into the fuel gas channel 42 of the second metal separator 20, and flows along the anode electrode 68 of the membrane electrode assembly 16.

Accordingly, in the membrane electrode assembly 16, the oxidant gas supplied to the cathode electrode 66 and the fuel gas supplied to the anode electrode 68 are consumed in electrochemical reactions in the cathode-side electrode catalyst layer 66b and the anode-side electrode catalyst layer 68b, and thereby electric power is generated.

Next, the oxidant gas, which has been supplied to the cathode electrode 66 and consumed, is discharged to the oxidant gas outlet manifold 26b and flows in the direction of arrow A. Likewise, the fuel gas, which has been supplied to the anode electrode 68 and consumed, is discharged to the fuel gas outlet manifold 30b and flows in the direction of arrow A.

The coolant is introduced from the coolant inlet manifold 28a into the coolant channel 46 between the first metal separator 18 and the second metal separator 20, and then flows in the direction of arrow B. The coolant cools the membrane electrode assembly 16, flows along the coolant outlet manifold 28b, and is discharged from the fuel cell 10.

In the first embodiment, for example, as illustrated in FIGS. 1 and 5, the inlet connection channel 60a is disposed on the surface 20a of the second metal separator 20. The inlet connection channel 60a connects the fuel gas inlet manifold 30a and the fuel gas channel 42 (actually, the inlet buffer portion 45a) to each other. The inlet connection channel 60a is formed between the plurality of protruding elastic members 62a so as to extend in the direction of arrow B. The protruding elastic members 62a are integrally formed with the second sealing member 50.

Each of the protruding elastic members 62a has the overlapping regions 62a/1 and 62a/2, which overlap the protruding sealing portion 48c of the first sealing member 48 as seen from the stacking direction. The overlapping regions 62a/1 and 62a/2 are separated from each other in the direction in which the fuel gas flows. In other words, the protruding elastic member 62a is separated into two portions so as to correspond to the sealing portions 48cs1 and 48cs2 (and the sealing portions 48bs1 and 48bs2).

Therefore, as illustrated in FIG. 3, the compressive load characteristics of the protruding elastic member 62a do not differ between portions of the protruding elastic member 62a. Accordingly, a nonuniform reactive force is not generated in the sealing portions 48*cs*1 and 48*cs*2 (and the sealing portions 48*bs*1 and 48*bs*2), and the sealing surface pressure becomes uniform. Thus, an advantage is obtained in that deformation of the first metal separator 18 (and the second metal separator 20), nonuniformity of the sealing surface pressure, and nonuniformity in the channel width of the inlet connection channel 60*a* can be appropriately suppressed.

The inlet connection channel 52*a* is disposed on the surface 18*a* of the first metal separator 18. The inlet connection channel 52*a* connects the oxidant gas inlet manifold 26*a* and the inlet buffer portion 41*a* to each other. The inlet connection channel 52*a* is formed between the plurality of protruding elastic members 54*a* so as to extend in the direction of arrow B. The protruding elastic members 54*a* are integrally formed with the first sealing member 48. Each of the protruding elastic members 54*a* is separated into two portions so as to correspond to the sealing portions 48*cs*1 and 48*cs*2.

Therefore, as can be seen from FIG. 2, the compressive load characteristics of the protruding elastic member 54*a* do not differ between portions of the protruding elastic member 54*a*. Accordingly, variation in the surface pressures of the sealing portions 48*cs*1 and 48*cs*2 and deformation of the first metal separator 18 (and the second metal separator 20) can be reliably suppressed.

Moreover, the inlet connection channel 56*a* is disposed on the surface 18*b* of the first metal separator 18. The inlet connection channel 56*a* connects the coolant inlet manifold 28*a* and the coolant channel 46 to each other. The inlet connection channel 56*a* is formed between the plurality of protruding elastic members 58*a*. The protruding elastic members 58*a* are integrally formed with the first sealing member 48. Each of the protruding elastic members 58*a* is separated into two portions so as to correspond to the sealing portions 48*bs*1 and 48*bs*2.

Thus, variation in the surface pressures of the sealing portions 48*bs*1 and 48*bs*2 and deformation of the first metal separator 18 (and the second metal separator 20) can be reliably suppressed.

The outlet connection channels 52*b*, 56*b* and 60*b* have structures substantially the same as those of the inlet connection channels 52*a*, 56*a* and 60*a*, respectively. Therefore, advantages the same as those described above can be obtained. The first embodiment has the inlet buffer portions 41*a* and 45*a* and the outlet buffer portions 41*b* and 45*b*. However, these buffer portions may be omitted.

Figure 7:
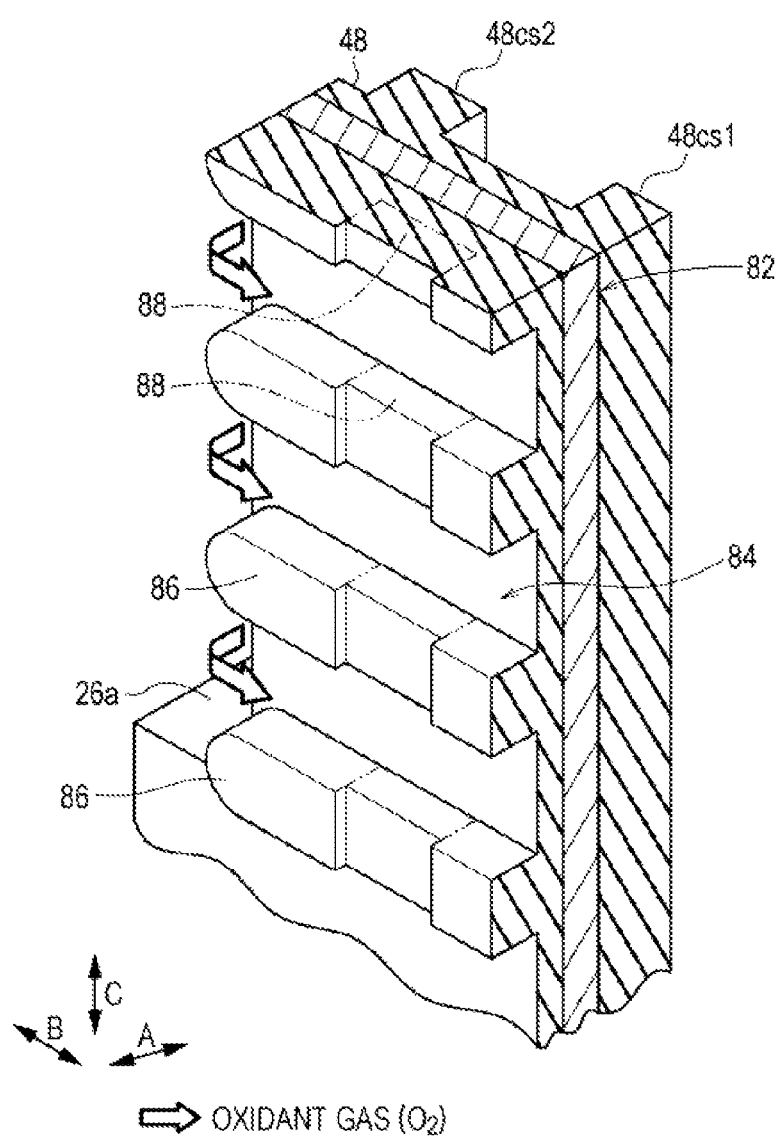
FIG. 7 is a partial perspective view of a first metal separator of a fuel cell according to a second embodiment of the present disclosure.

FIG. 7 is a partial perspective view of a first metal separator 82 of a fuel cell 80 according to a second embodiment the present disclosure.

Parts of the first metal separator 82 the same as those of the first metal separator 18 of the fuel cell 10 according to the first embodiment will be denoted by the same numerals, and detailed description of such parts will be omitted. Likewise, detailed description of such components in third to fifth embodiments (described below) will be omitted.

In the second embodiment, only an inlet connection channel 84, which corresponds to the inlet connection channel 52*a* of the first embodiment, will be described. Portions of the second embodiment corresponding to the inlet connection channels 56*a* and 60*a* and the outlet connection channel 52*b*, 56*b* and 60*b* have structures substantially the same as that of the inlet connection channel 84.

The inlet connection channel 84 is formed between a plurality of protruding elastic members (so-called rubber bridges) 86 so as to extend in the direction of arrow B. The protruding elastic members 86 are integrally formed with the first sealing member 48. Each of the protruding elastic members 86 is separated into two portions so as to correspond to the sealing portions 48*cs*1 and 48*cs*2 of the first sealing member 48 as seen from the stacking direction (direction of arrow A).

An elastic member 88, whose height is less than that of the protruding elastic member 86, is disposed at the portion between separated protruding elastic members 86. The width of the elastic member 88 (in the direction of arrow C) is the same as that of the protruding elastic member 86. The height of the elastic member 88 is set at an appropriate value such that the elastic member 88 does not receive a load from an adjacent metal separator and leakage of the oxidant gas is not likely to occur when the protruding elastic member 86 is compressed and deformed due to a stacking load applied thereto. Preferably, the height of the elastic member 88 is greater than ½ of the height of the channel. The elastic member 88 is integrally formed with the protruding elastic member 86 from the same material. Alternatively, an elastic member made of the same material or a different material may be attached to the protruding elastic member 86.

In the second embodiment described above, the protruding elastic member 86 is separated into two portions. Therefore, the second embodiment has advantages the same as those of the first embodiment in that, for example, variation in the sealing surface pressure and deformation of the first metal separator 82 can be reliably suppressed with a simple structure.

The elastic member 88, whose height is less than that of the protruding elastic member 86, is disposed at the portion between the separated protruding elastic members 86. Accordingly, the oxidant gas flows smoothly along the channel grooves of the inlet connection channel 84, that is, in a direction in which the protruding elastic member 86 extends, and the oxidant gas flowing along one of the channel grooves does not leak to an adjacent channel groove. Thus, in particular, when a water droplet is generated in one of the channel grooves, the generated water is prevented from being held in a gap between the channel groove and an adjacent channel groove, and the water can be reliably drained with the oxidant gas flowing along the channel grooves.

Figure 8:
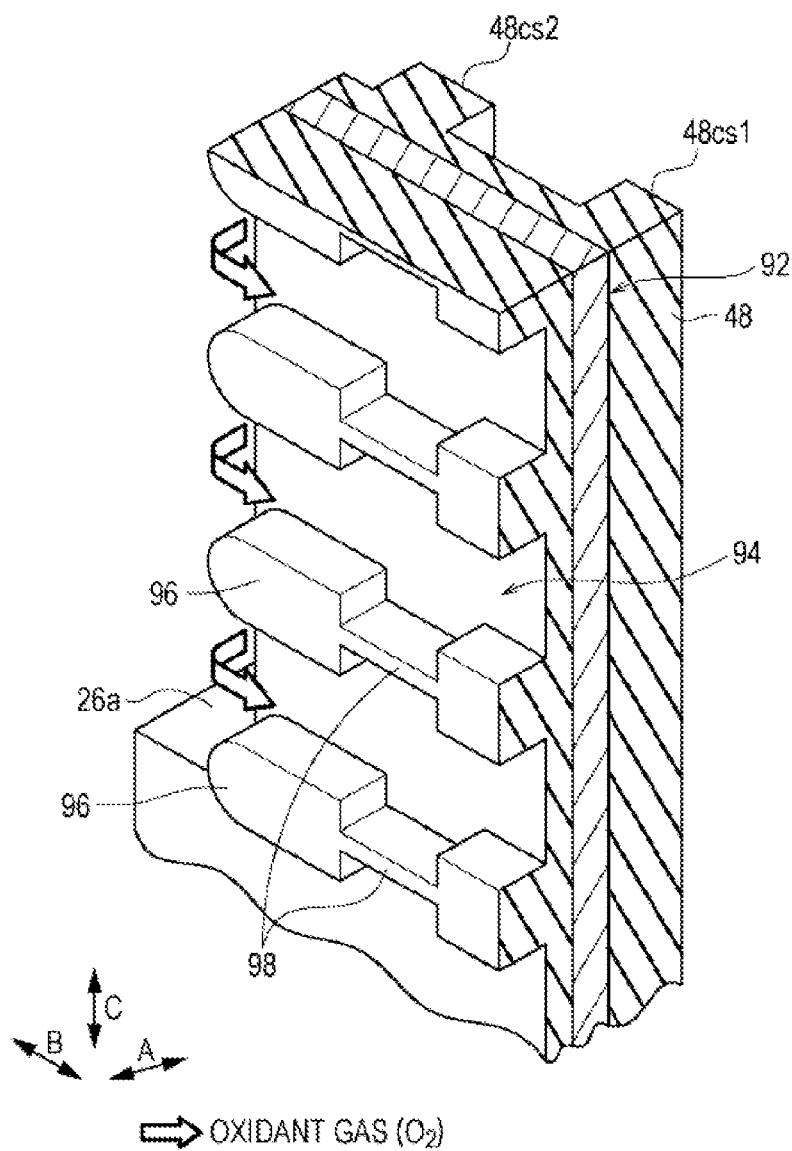
FIG. 8 is a partial perspective view of a first metal separator of a fuel cell according to a third embodiment of the present disclosure.

FIG. 8 is a partial perspective view of a first metal separator 92 of a fuel cell 90 according to a third embodiment the present disclosure.

An inlet connection channel 94, which corresponds to the inlet connection channel 52*a* of the first embodiment, is disposed on the first metal separator 92. The inlet connection channel 94 is formed between a plurality of protruding elastic members (so-called rubber bridges) 96 so as to extend in the direction of arrow B. The protruding elastic members 96 are integrally formed with the first sealing member 48. Each of the protruding elastic members 96 is separated into portions so as to correspond to the sealing portions 48*cs*1 and 48*cs*2 of the first sealing member 48 as seen from the stacking direction (direction of arrow A).

An elastic member 98 whose width in a direction (direction of arrow C) that crosses the flow direction of the oxidant gas is less than that of the protruding elastic member 96 is disposed at the portion between the separated protruding elastic members 96. Preferably, the protruding elastic member 96 and the elastic member 98 are symmetric about their centers in the width direction, and the centers of the protruding elastic member 96 and the elastic member 98 in the width direction coincide with each other. The height of the protruding elastic member 96 is the same as the height of the elastic member 98. Preferably, the width of the elastic member 98 is ½ of the width of the protruding elastic member 96 or less. The elastic member 98 is integrally formed with the protruding elastic member 96 from the same material. Alternatively, an elastic member made of the same material or a different material may be attached to the protruding elastic member 96.

In the third embodiment described above, the protruding elastic member 96 is separated, and the elastic member 98, which has a width less than that of the protruding elastic member 96, is disposed between the separated portions of the protruding elastic members 96. Therefore, the third embodiment has advantages the same as those of the first and second embodiments.

Figure 9:
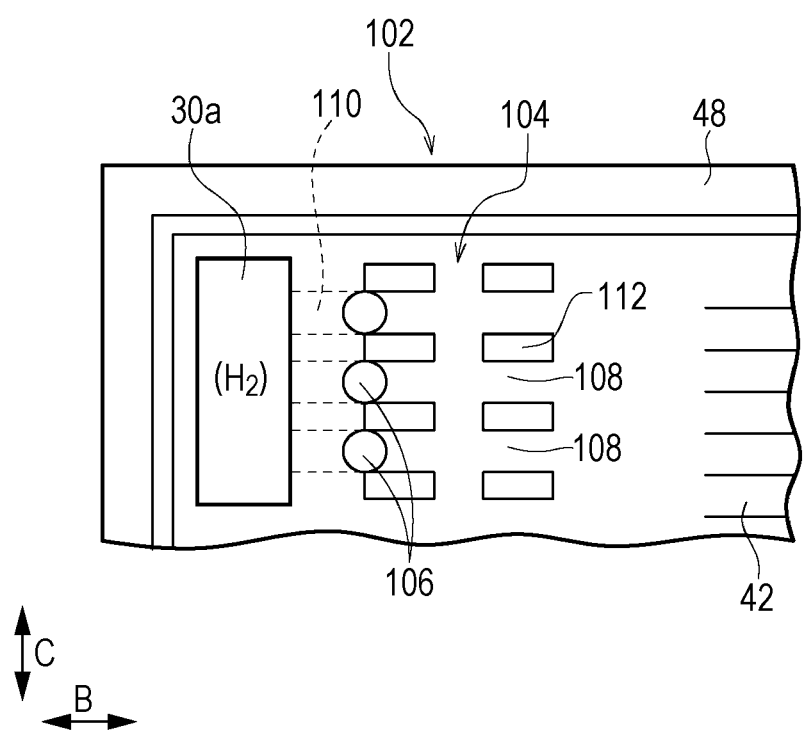
FIG. 9 is a partial plan view of a first metal separator of a fuel cell according to a fourth embodiment of the present disclosure.

FIG. 9 is a partial plan view of a metal separator 102 of a fuel cell 100 according to a fourth embodiment of the present disclosure.

An inlet connection channel 104, which corresponds to the inlet connection channel 60a (on the fuel gas side) of the first embodiment, is disposed on the metal separator 102. The inlet connection channel 104 has a plurality of supply through-holes 106 extending through portions of the metal separator 102 near the fuel gas inlet manifold 30a. A plurality of connection channel grooves 108, which connect the supply through-holes 106 and the inlet side of the fuel gas channel 42 to each other, are disposed on a side on which the fuel gas channel 42 is disposed. A plurality of connection channel grooves 110, which connect the supply through-holes 106 and the fuel gas inlet manifold 30a to each other, are disposed on a side opposite to the side on which the fuel gas channel 42 is disposed.

The connection channel grooves 108 are formed between a plurality of protruding elastic members (so-called rubber bridges) 112 so as to extend in the direction of arrow B. The protruding elastic members 112 are integrally formed with the first sealing member 48. Each of the protruding elastic member 112 has overlapping regions that overlap sealing members (not shown) on the back side of the metal separator as seen from the stacking direction (direction of arrow A), and the overlapping regions are separated from each other in the direction in which the fuel gas flows. The protruding elastic members 112 may have any of the structures of the protruding elastic members in the first to third embodiments.

Accordingly, the fourth embodiment has advantages the same as those of the first to third embodiments.

Figure 10:
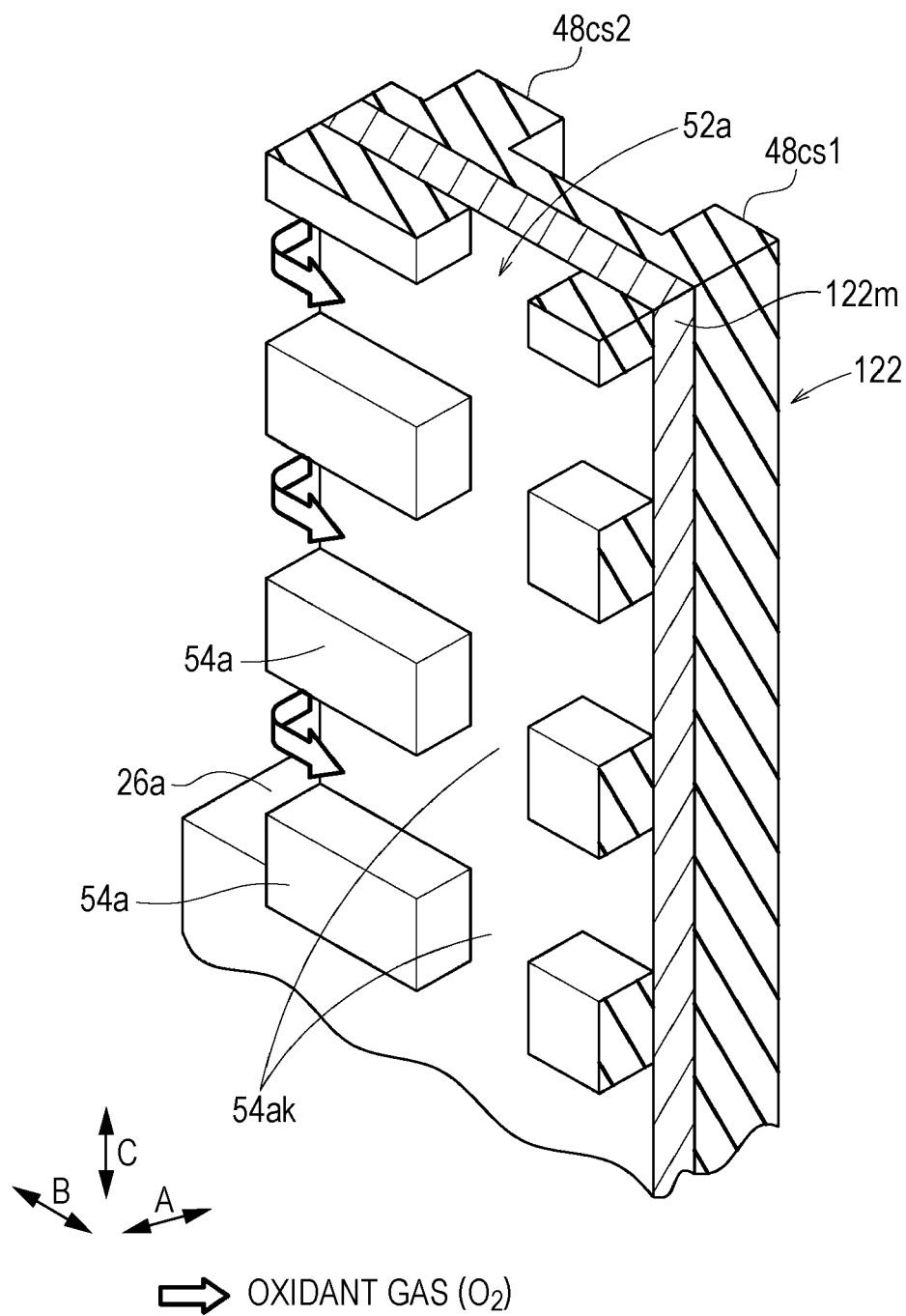
FIG. 10 is a partial perspective view of a first metal separator of a fuel cell according to a fifth embodiment of the present disclosure.

FIG. 10 is a partial perspective view of a first metal separator 122 of a fuel cell 120 according to a fifth embodiment the present disclosure. Parts of the first metal separator 122 the same as those of the first metal separator 18 of the fuel cell 10 according to the first embodiment will be denoted by the same numerals, and detailed description of such parts will be omitted.

In the first metal separator 122, the protruding elastic members 54a, which form the inlet connection channel 52a, are directly disposed on a metal plate 122m. Therefore, the fifth embodiment has advantages the same as those of the first embodiment. The first metal separator 82 according to the second embodiment and the first metal separator 92 according to the third embodiment may have structures substantially the same as that of the first metal separator 122.

According to an aspect of an embodiment of the present disclosure, a fuel cell includes a membrane electrode assembly including an electrolyte membrane and a pair of electrodes sandwiching the electrolyte membrane therebetween; a separator stacked on the membrane electrode assembly; a fluid channel through which a fluid flows in an in-plane direction of the separator, the fluid being at least one of a fuel gas, an oxidant gas, and a coolant; a fluid manifold through which the fluid flows in a stacking direction of the separator; and a connection channel formed between a plurality of protruding elastic members, the connection channel connecting the fluid channel and the fluid manifold to each other.

In the fuel cell, a plurality of sealing members are disposed adjacent to the plurality of protruding elastic members in the stacking direction, the plurality of sealing members extending in a direction that crosses a flow direction in which the fluid flows along the connection channel; and each of the plurality of protruding elastic members has overlapping regions that overlap the sealing members as seen from the stacking direction, the overlapping regions being separated from each other in the flow direction.

It is preferable that each of the protruding elastic members be separated into portions the number of which is the same as that of the sealing members.

It is preferable that, at the portion between the separated protruding elastic members, an elastic member whose height is less than that of the protruding elastic member be disposed.

It is preferable that, at the portion between the separated protruding elastic members, an elastic member whose width in a direction that crosses the flow direction is less than that of the protruding elastic member be disposed.

It is preferable that a through-hole be formed at a position near the fluid manifold, the through-hole being opened between an adjacent pair of the plurality of protruding elastic members; and one end of the through-hole be connected to the connection channel on a side on which the fluid channel is disposed, and the other end of the through-hole be connected to the fluid manifold on a side opposite to the side on which the fluid channel is disposed.

According to an embodiment of the present disclosure, each of the protruding elastic members has overlapping regions that overlap the sealing members in the stacking direction, and the overlapping regions are separated from each other in the flow direction. Therefore, the compressive load characteristics of the protruding elastic member do not differ depending on the portions of the protruding elastic member. Accordingly, variation in the surface pressure of the sealing member and deformation of the separator can be reliably suppressed with a simple structure.

Obviously, numerous modifications and variations of the present invention are possible in light of the above teachings. It is therefore to be understood that within the scope of the appended claims, the invention may be practiced otherwise than as specifically described herein.

What is claimed is:
1. A fuel cell comprising:
a membrane electrode assembly including an electrolyte membrane and a pair of electrodes sandwiching the electrolyte membrane therebetween;
a separator having a surface and stacked on the membrane electrode assembly in a stacking direction perpendicular to the surface so that the surface faces the membrane electrode assembly;
a fluid channel through which a fluid is to flow along the surface of the separator, the fluid including at least one of a fuel gas, an oxidant gas, and a coolant;
a buffer portion having a plurality of protrusions protruding toward the membrane electrode assembly;
a fluid manifold through which the fluid is to flow in the stacking direction;
a plurality of protruding elastic members between which a connection channel is provided to connect the fluid channel and the fluid manifold, the connection channel extending from the fluid manifold toward the buffer portion;

a plurality of sealing members provided adjacent to the plurality of protruding elastic members in the stacking direction and extending in a direction to cross a flow direction in which the fluid flows along the connection channel; and each of the plurality of protruding elastic members having overlapping regions that overlap the plurality of sealing members as seen from the stacking direction, the overlapping regions being separated from each other in the flow direction, wherein the overlapping regions of at least two elastic members of the plurality of elastic members overlap a first sealing member of the plurality of sealing members as seen from the stacking direction, wherein each of the plurality of protruding elastic members is separated into portions a number of which is equal to a number of the plurality of sealing members, and wherein a first one of the protruding elastic member portions has a center in the flow direction, a center of the first sealing member overlapping the center of the first protruding elastic member portion.

2. The fuel cell according to claim 1,
wherein, at a region between each of the protruding elastic member portions in the flow direction, an elastic member whose height is less than a height of the protruding elastic member is disposed.

3. The fuel cell according to claim 1,
wherein, at a region between each of the protruding elastic member portions in the flow direction, an elastic member whose width in the direction to cross the flow direction is less than a width of the protruding elastic member is disposed.

4. The fuel cell according to claim 1,
wherein a through-hole is provided at a position near the fluid manifold, the through-hole having an opening between an adjacent pair of the plurality of protruding elastic members, and
wherein one end of the through-hole is connected to the connection channel on a first side on which the fluid channel is disposed, and another end of the through-hole is connected to the fluid manifold on a second side opposite to the first side on which the fluid channel is disposed.

5. The fuel cell according to claim 1,
wherein the surface of the separator has a first surface and a second surface opposite to the first surface,
wherein the plurality of protruding elastic members are provided on the first surface, and
wherein the plurality of sealing members are provided on the second surface.

6. A fuel cell comprising:
a membrane electrode assembly comprising:
　an electrolyte membrane;
　a first electrode; and
　a second electrode, the first electrode and the second electrode sandwiching the electrolyte membrane therebetween;
a separator having a surface and stacked on the membrane electrode assembly in a stacking direction perpendicular to the surface so that the surface faces the membrane electrode assembly;
a fluid channel which is provided between the surface of the separator and the membrane electrode assembly and through which a fluid is to flow along the surface of the separator, the fluid including at least one of a fuel gas, an oxidant gas, and a coolant;

a buffer portion having a plurality of protrusions protruding toward the membrane electrode assembly;

a fluid manifold which is provided to pass through the separator along the stacking direction and through which the fluid is to flow in the stacking direction;

a plurality of protruding elastic members between which a connection channel is provided to connect the fluid channel and the fluid manifold, the connection channel extending from the fluid manifold toward the buffer portion;

a plurality of sealing members provided adjacent to the plurality of protruding elastic members in the stacking direction and extending in a direction to cross a flow direction in which the fluid flows along the connection channel; and each of the plurality of protruding elastic members having overlapping regions that overlap the plurality of sealing members as seen from the stacking direction, the overlapping regions being separated from each other in the flow direction, wherein the overlapping regions of at least two elastic members of the plurality of elastic members overlap a first sealing member of the plurality of sealing members as seen from the stacking direction, wherein each of the plurality of protruding elastic members is separated into portions a number of which is equal to a number of the plurality of sealing members, and wherein a first one of the protruding elastic member portions has a center in the flow direction, a center of the first sealing member overlapping the center of the first protruding elastic member portion.

7. The fuel cell according to claim 1,
wherein each of the protruding elastic members has a cutout portion that corresponds to a space between the sealing members, the protruding elastic members being adjacent to the space in the stacking direction.

8. The fuel cell according to claim 1,
wherein each of the protruding elastic members has a length in a direction aligned with the flow direction and a width in a direction orthogonal to the flow direction and the stacking direction, the length of each protruding elastic member being greater than the width of each protruding elastic member.

9. The fuel cell according to claim 6,
wherein each of the protruding elastic members has a cutout portion that corresponds to a space between the sealing members, the protruding elastic members being adjacent to the space in the stacking direction.

10. The fuel cell according to claim 6,
wherein each of the protruding elastic members has a length in a direction aligned with the flow direction and a width in a direction orthogonal to the flow direction and the stacking direction, the length of each protruding elastic member being greater than the width of each protruding elastic member.

11. The fuel cell according to claim 1,
wherein each of the protruding elastic members has a length in a direction aligned with the flow direction and a width in a direction orthogonal to the flow direction and the stacking direction, the length of each of the protruding elastic members being greater than the width of each of the protruding elastic members, and wherein each of the sealing members has a length in a direction aligned with the flow direction and a width in a direction orthogonal to the flow direction and the stacking direction, the length of each sealing member being less than the width of each sealing member.

12. The fuel cell according to claim 6,
wherein each of the protruding elastic members has a length in a direction aligned with the flow direction and a width in a direction orthogonal to the flow direction and the stacking direction, the length of each of the protruding elastic members being greater than the width of each of the protruding elastic members, and
wherein each of the sealing members has a length in a direction aligned with the flow direction and a width in a direction orthogonal to the flow direction and the stacking direction, the length of each sealing member being less than the width of each sealing member.

13. The fuel cell according to claim 1,
wherein each of the protruding elastic member portions has a first end and a second end that are separated from each other in the flow direction, and
wherein a first distance between the first end of each of the protruding elastic member portions and a corresponding one of the sealing members is equal to a second distance between the second end of the protruding elastic member portions and the corresponding one of the sealing members.

14. The fuel cell according to claim 6,
wherein each of the protruding elastic member portions has a first end and a second end that are separated from each other in the flow direction, and
wherein a first distance between the first end of each of the protruding elastic member portions and a corresponding one of the sealing members is equal to a second distance between the second end of the protruding elastic member portions and the corresponding one of the sealing members.

* * * * *